United States Patent
Chheda et al.

(10) Patent No.: US 11,151,082 B1
(45) Date of Patent: Oct. 19, 2021

(54) FILE SYSTEM OPERATION CANCELLATION

(71) Applicant: EMC IP Holding Company LLC, Mountain View, CA (US)

(72) Inventors: Deepti Chheda, San Francisco, CA (US); Diwaker Gupta, San Francisco, CA (US); Vaibhav Kamra, Sunnyvale, CA (US); Nathan Rosenblum, San Francisco, CA (US); Niraj Tolia, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 290 days.

(21) Appl. No.: 14/675,572

(22) Filed: Mar. 31, 2015

(51) Int. Cl.
*G06F 16/16* (2019.01)
*G06F 16/13* (2019.01)
*G06F 16/182* (2019.01)

(52) U.S. Cl.
CPC .............. *G06F 16/16* (2019.01); *G06F 16/13* (2019.01); *G06F 16/182* (2019.01)

(58) Field of Classification Search
CPC ............. H04L 67/1097; H04L 67/1021; H04L 67/2842; G06F 3/061; G06F 3/067; G06F 17/30194; G06F 16/16; G06F 16/164; G06F 16/182; G06F 16/13
See application file for complete search history.

(56) References Cited

U.S. PATENT DOCUMENTS

| | | | |
|---|---|---|---|
| 6,389,427 B1 | 5/2002 | Faulkner | |
| 6,978,279 B1 | 12/2005 | Lomet | |
| 7,627,671 B1 | 12/2009 | Palma | |
| 7,849,098 B1 | 12/2010 | Scales | |
| 8,078,579 B2 | 12/2011 | Grossman | |
| 8,392,465 B2 | 3/2013 | Bojanic | |
| 8,589,553 B2 * | 11/2013 | Kruse | G06F 17/3012 709/223 |
| 8,868,626 B2 | 10/2014 | Iftode | |
| 9,886,443 B1 | 2/2018 | Gupta | |
| 2003/0198189 A1 | 10/2003 | Roberts | |
| 2006/0101081 A1 | 5/2006 | Lin | |
| 2007/0294663 A1 | 12/2007 | McGuire | |
| 2008/0037854 A1 * | 2/2008 | Grossman | G06F 8/70 382/135 |
| 2008/0228938 A1 * | 9/2008 | Plamondon | H04L 12/4641 709/233 |
| 2009/0112789 A1 * | 4/2009 | Oliveira | G06F 17/30082 |
| 2010/0042626 A1 | 2/2010 | Verma | |
| 2011/0113408 A1 * | 5/2011 | Hamby | G06N 5/022 717/136 |

(Continued)

*Primary Examiner* — Vaishali Shah
(74) *Attorney, Agent, or Firm* — Krishnendu Gupta; Nikhil Patel

(57) ABSTRACT

Cancelling file system operations at a file system client of a distributed file system is disclosed. In various embodiments, an indication is received to send locally-stored file system operations to a remote file system metadata server. A dependency graph or other data structure reflecting dependencies between the locally-stored file system operations is used to identify a set of locally-stored file system operations the members of which are fully dominated by a create-delete pair of operations comprising the set. The locally-stored file system operations comprising the set are cancelled, without being sent to the remote file system metadata server.

26 Claims, 18 Drawing Sheets

(56) References Cited

U.S. PATENT DOCUMENTS

| | | | |
|---|---|---|---|
| 2011/0145499 A1* | 6/2011 | Ananthanarayanan | ...................... G06F 12/0866 711/118 |
| 2011/0145844 A1 | 6/2011 | Shafi | |
| 2011/0167247 A1* | 7/2011 | Gibbs | ................. G06F 9/30054 712/240 |
| 2011/0179082 A1 | 7/2011 | Vaghani | |
| 2012/0072596 A1* | 3/2012 | Kruse | ................. G06F 21/6227 709/226 |
| 2012/0123825 A1 | 5/2012 | Biran | |
| 2012/0254842 A1 | 10/2012 | Henderson | |
| 2012/0266129 A1 | 10/2012 | Massoudi | |
| 2012/0303685 A1 | 11/2012 | Ulrich | |
| 2013/0097211 A1* | 4/2013 | Kruse | ............... H04L 29/08072 707/827 |
| 2013/0179381 A1* | 7/2013 | Kawabata | ................ G06N 5/02 706/46 |
| 2013/0205295 A1 | 8/2013 | Ebcioglu | |
| 2014/0006751 A1 | 1/2014 | Aliseychik | |
| 2014/0007044 A1 | 1/2014 | Aliseychik | |
| 2014/0040197 A1 | 2/2014 | Wijayaratne | |
| 2014/0330778 A1* | 11/2014 | Schay | ............... G06F 17/30203 707/613 |
| 2015/0067088 A1 | 3/2015 | Guerin | |
| 2015/0106596 A1 | 4/2015 | Vorbach | |
| 2015/0172412 A1 | 6/2015 | Escriva | |
| 2015/0264445 A1 | 9/2015 | Lock | |
| 2015/0356110 A1 | 12/2015 | Lin | |

* cited by examiner

FILE SYSTEM OPERATION CANCELLATION

BACKGROUND OF THE INVENTION

Distributed file systems, file sharing services, etc. have been provided. In one approach, a file system client, application, and/or agent running on a client system may intercept or otherwise receive file system calls made by applications running on the client system, and may be configured to make corresponding calls to a remote file system server, e.g., a metadata server, to cause changes to file system metadata to be made at the server to reflect information associated with the file system call received at the client system. For example, requests to create a file, modify a file (thereby changing its size), move a file to a new directory, change ownership of the file, update a timestamp or other time attribute, and/or delete or otherwise remove a file, directory, or other object may be received at the client system, each requiring a corresponding operation to be performed at the file system metadata server to ensure the file system metadata as stored at the server reflects the file system call received at the client system.

Typically, a call to a remote file system server is made over a network, such as a wide area network (WAN). Each such call involves the use of resources and has associated therewith other costs, such as latency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Compounding file system metadata operations via buffering is disclosed. In various embodiments, a "metadata write lease" is obtained with respect to at least a portion of the metadata associated with a remotely stored file system. For example, the "metadata write lease" may cover one or more nodes, levels, subtrees, and/or other subsets of a hierarchical file system metadata. The metadata write lease in various embodiments enables a file system client or other agent at a client system to perform and buffer a series of operations affecting metadata associated with the portion of metadata with respect to which the metadata write lease has been obtained. In various embodiments, buffered operations may be compounded, as disclosed herein, and communicated to the file system metadata server (or other remote node) in a single packet, thereby consuming fewer resources and reducing latency.

Figure 1:
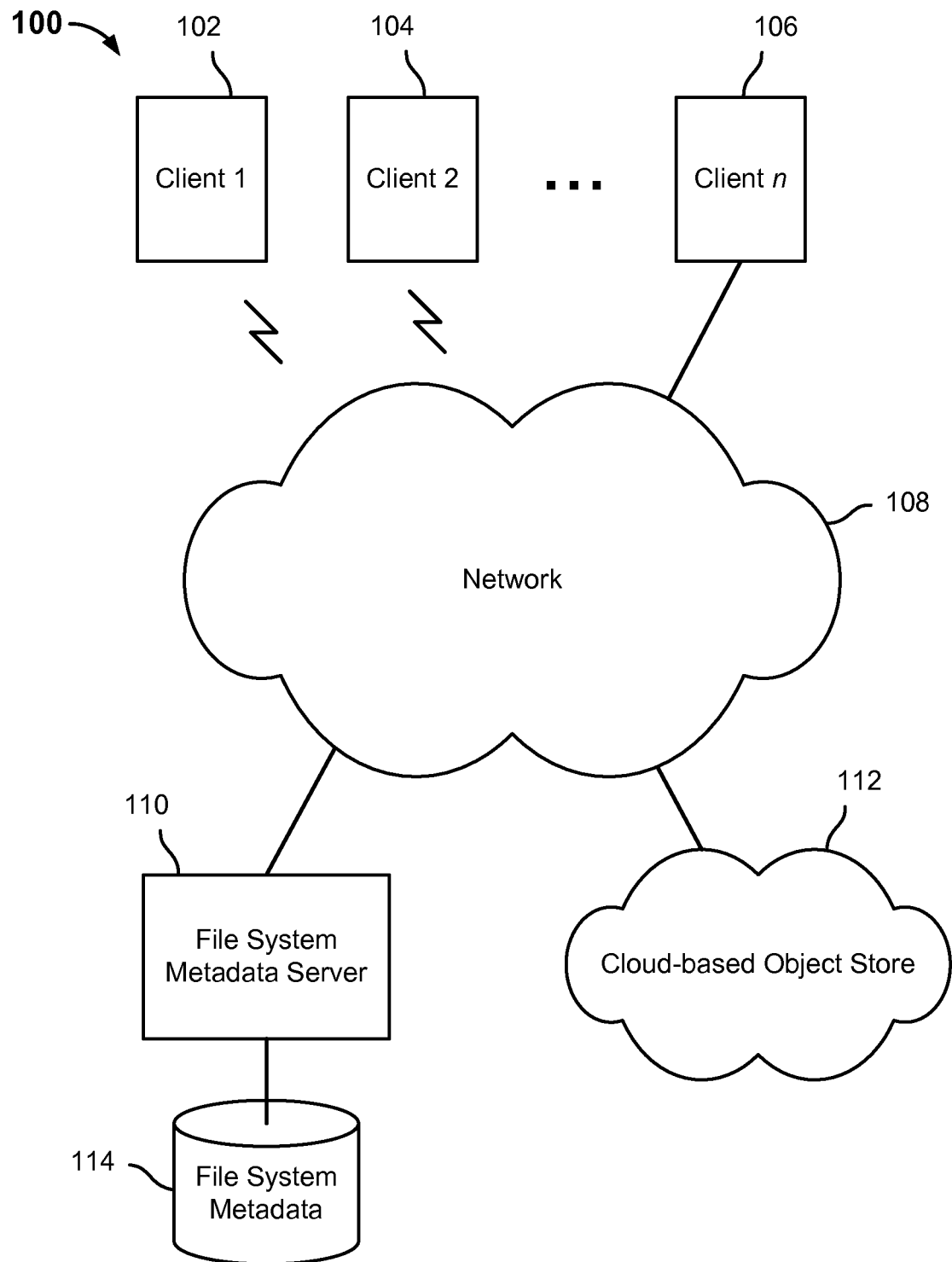
FIG. 1 is a block diagram illustrating an embodiment of a distributed file system and environment.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
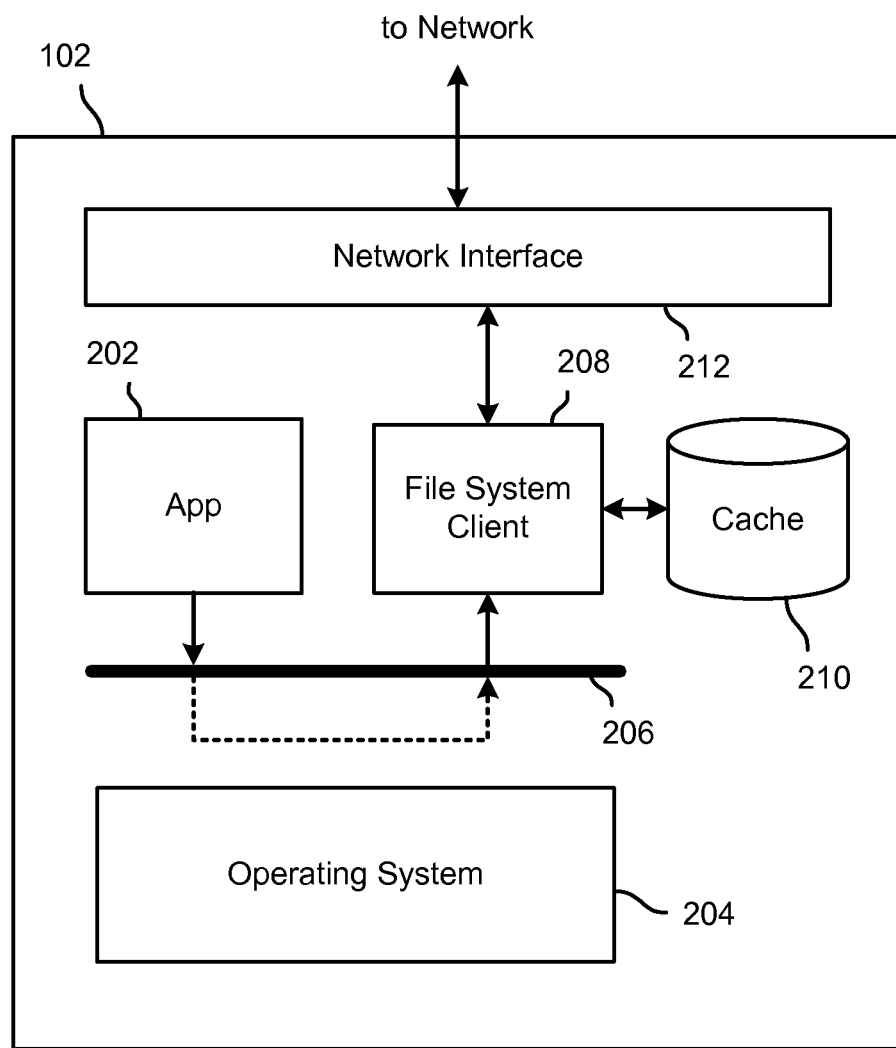
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. In some embodiments, file system agent 208 comprises a client application running in user space. In some embodiments, file system agent 208 comprises a kernel or other operating system component or module. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
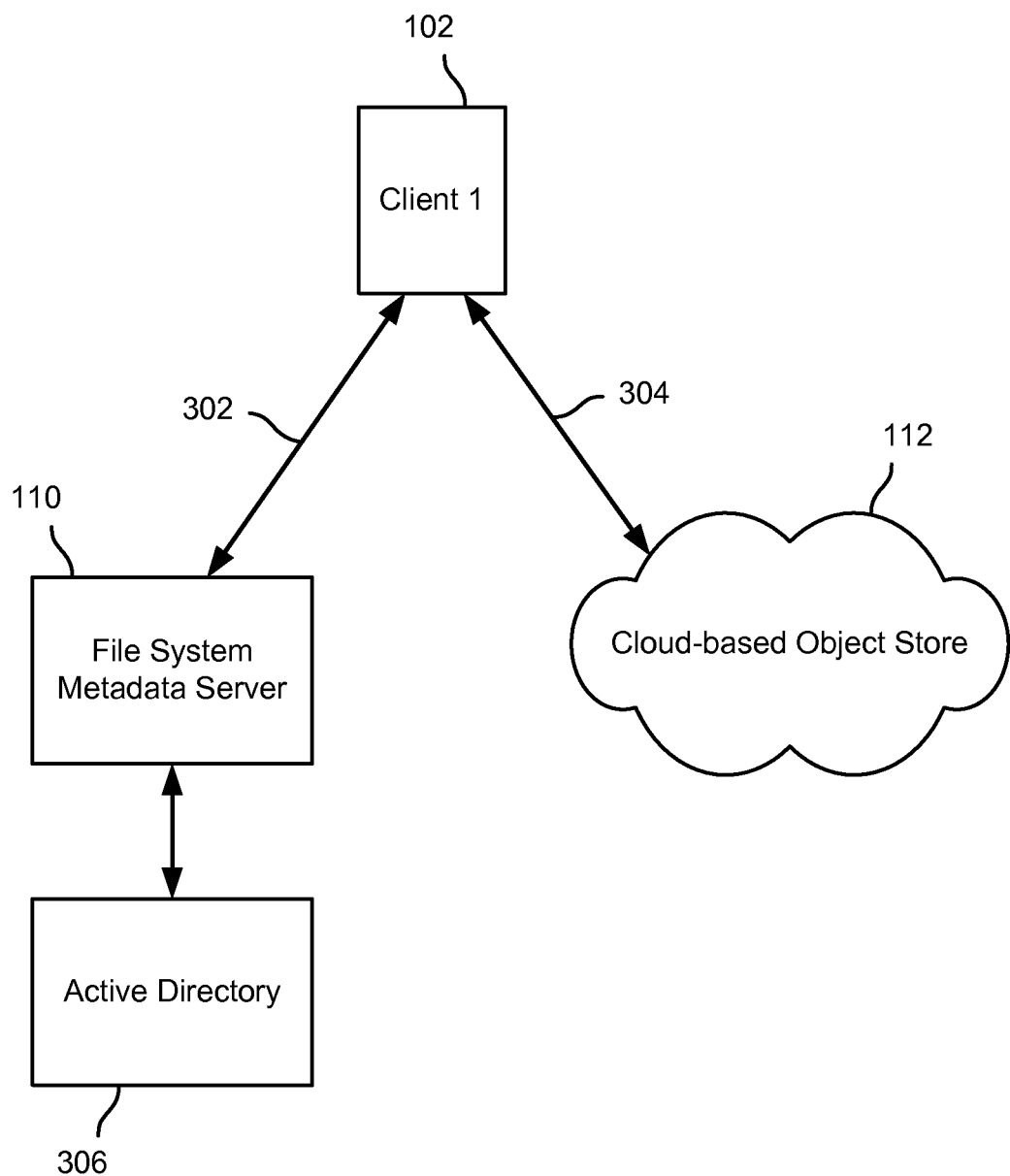
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
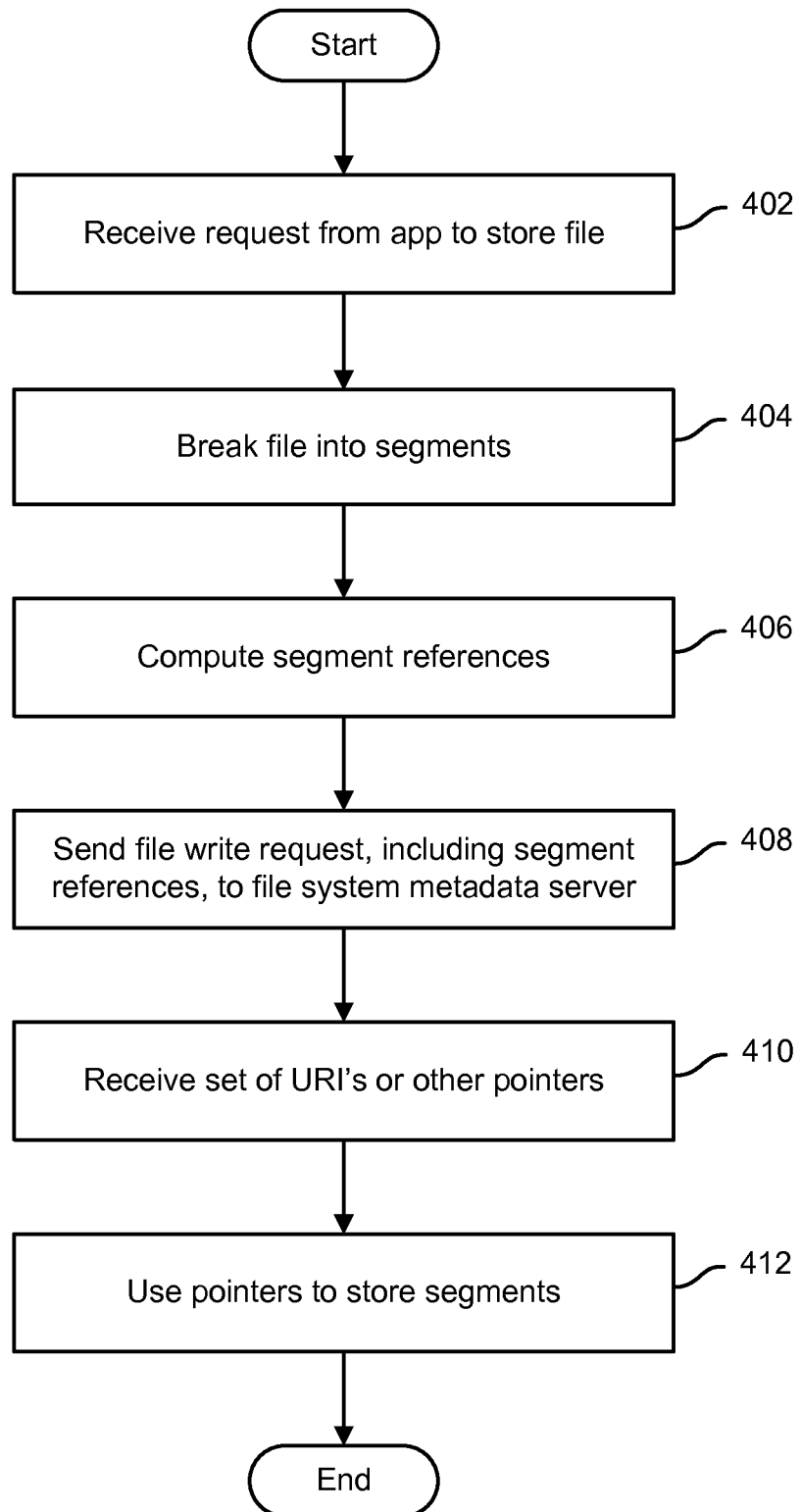
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
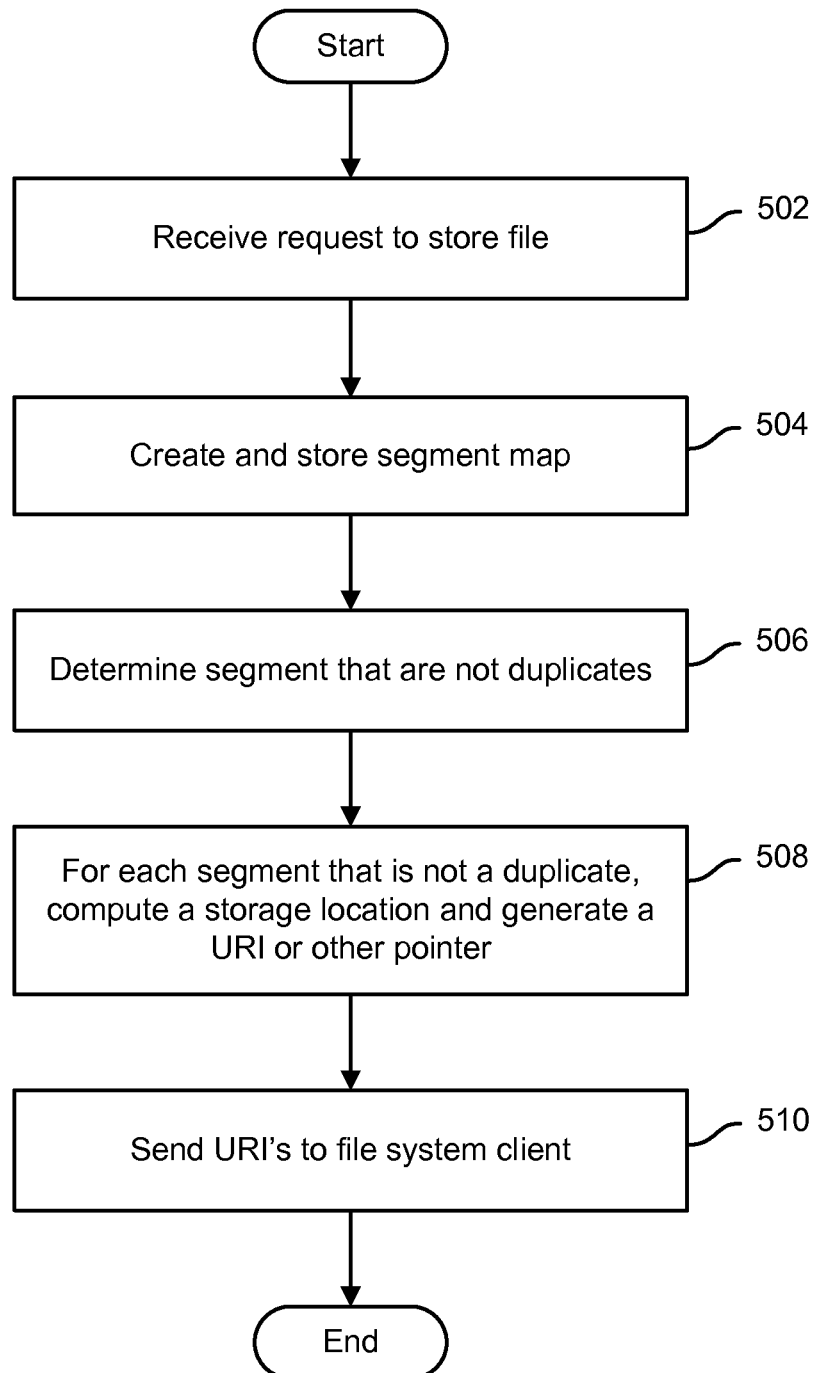
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
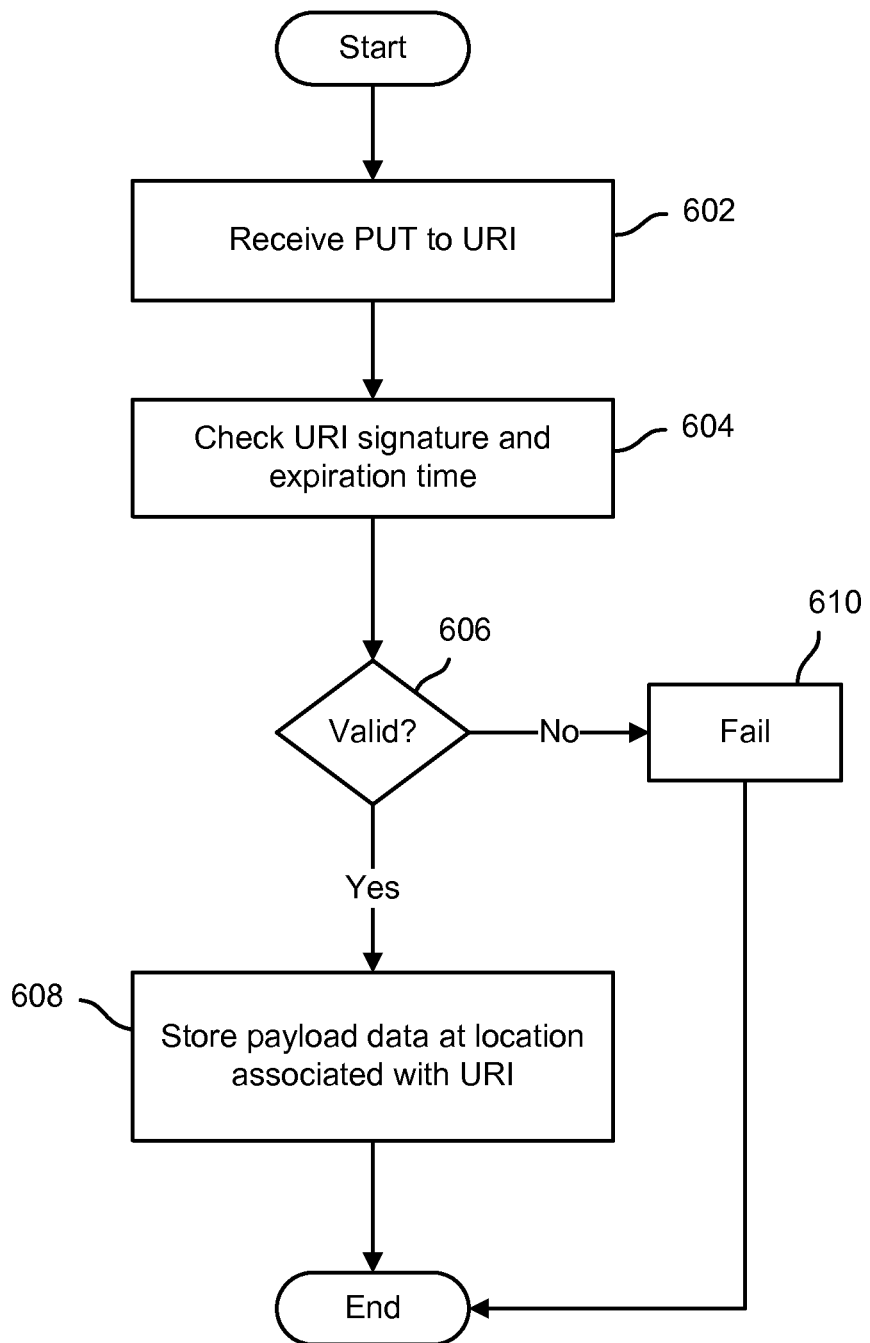
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
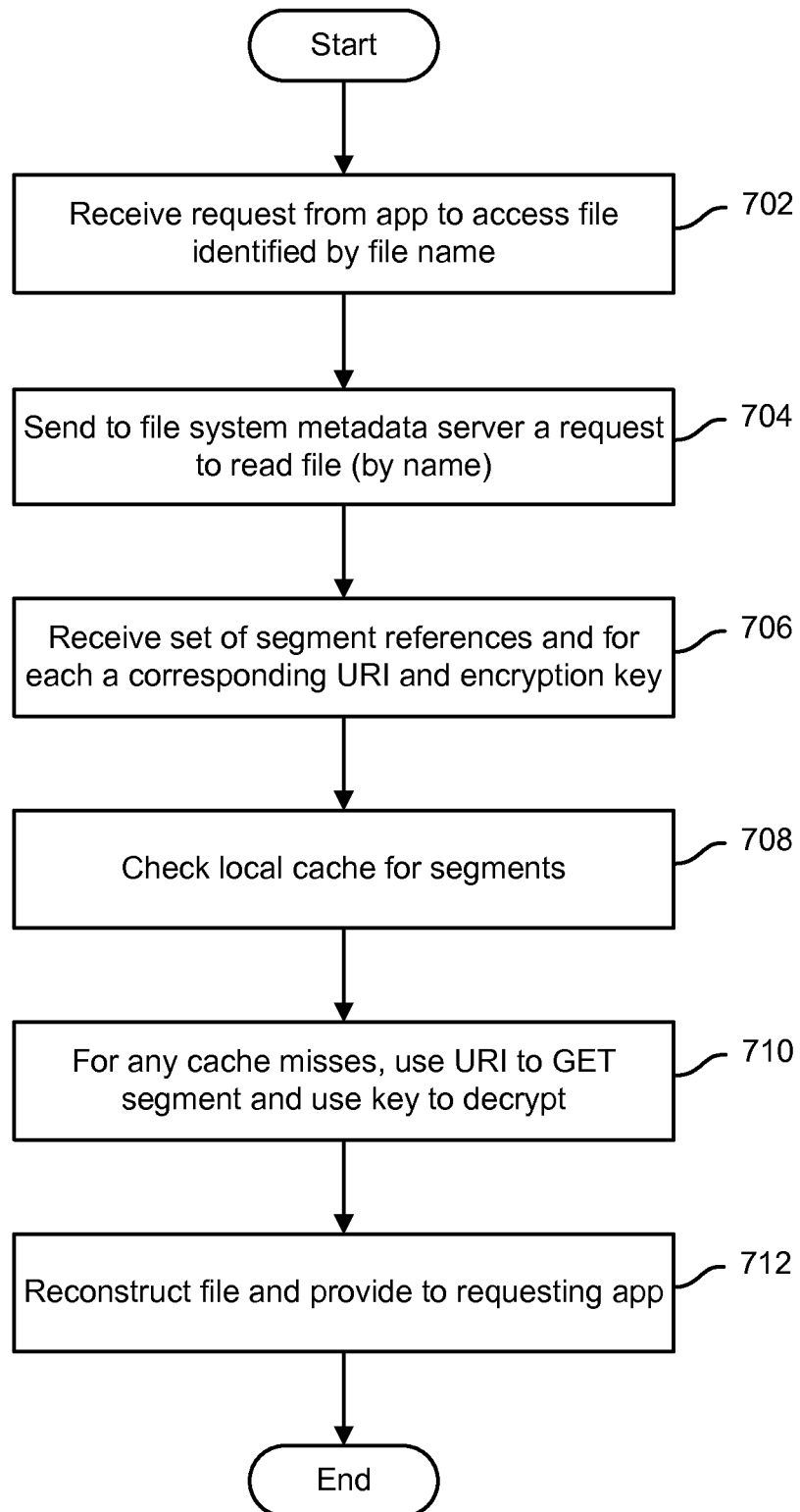
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
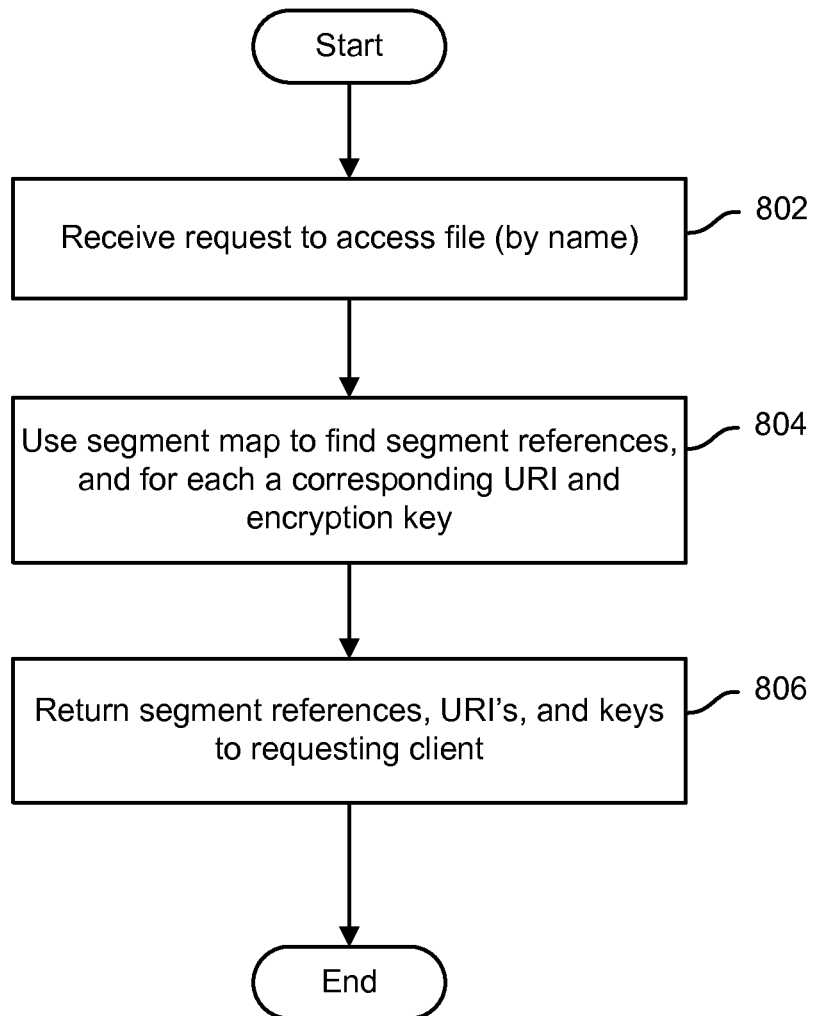
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

In various embodiments, file system operations such as those described above (store file system object, access file system object) and other file system operations (create object; modify object; change ownership, classification, security, or other metadata attributes; move object within file system hierarchy; delete or otherwise remove object; etc.) may involve and/or require writes to the file system metadata. The latency associated with network communications between a client system and a remote file system metadata server may result in undesirable delays in processing file system requests received from applications. In various embodiments, file system operations affecting metadata may be written to a local buffer. A metadata write lease may be obtained with respect to metadata associated with a specific portion of the file system. Metadata operations affecting the part of the file system metadata with respect to which a write lease is held may be buffered while the lease is held. A lease "break" communication and/or event may result in associated file system metadata operations being flushed from the metadata write buffer.

Figure 9:
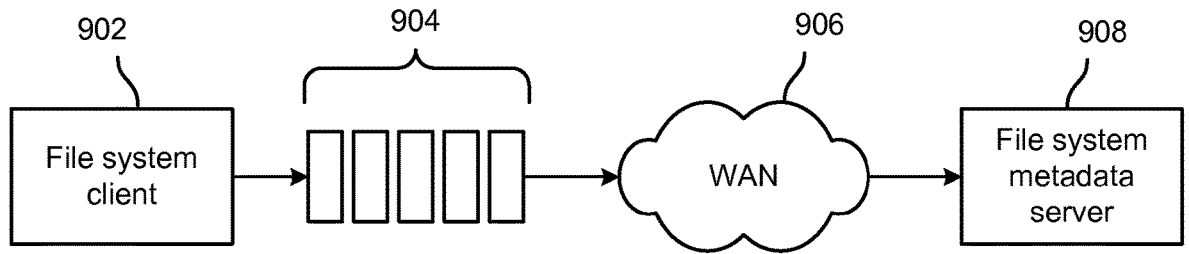
FIG. 9 is a block diagram illustrating an embodiment of a system to buffer file system operations that may affect distributed file system metadata.

FIG. 9 is a block diagram illustrating an embodiment of a system to buffer file system operations that may affect distributed file system metadata. In the example shown, file system client 902 writes to a buffer 904 requests to perform file system operations affecting file system metadata. Asynchronously, file system operation requests are pulled from buffer 904 and communicated via a wide area network (WAN) 906 to a remote file system metadata server 908. In various embodiments, file system metadata server 908 is configured to respond to a request from a client other than file system client 902 to perform operations affecting a portion of file system metadata with respect to which file system client 902 holds a write lease by sending a "break" or other communication to file system client 902. In response, file system client 902 "flushes" from the buffer (e.g., by sending them to the file system metadata server) at least those requests that are associated with the part of the file system with which the lease is associated.

Using a dependency graph of buffered file system operations to compound a plurality of operations into a single packet to be sent to the file system metadata server is disclosed. In various embodiments, a dependency graph (or other data structure and/or representation of dependencies) may be used to identify linear chains of operations suitable to be combined together in a single communication to the remote file system metadata server.

Figure 10:
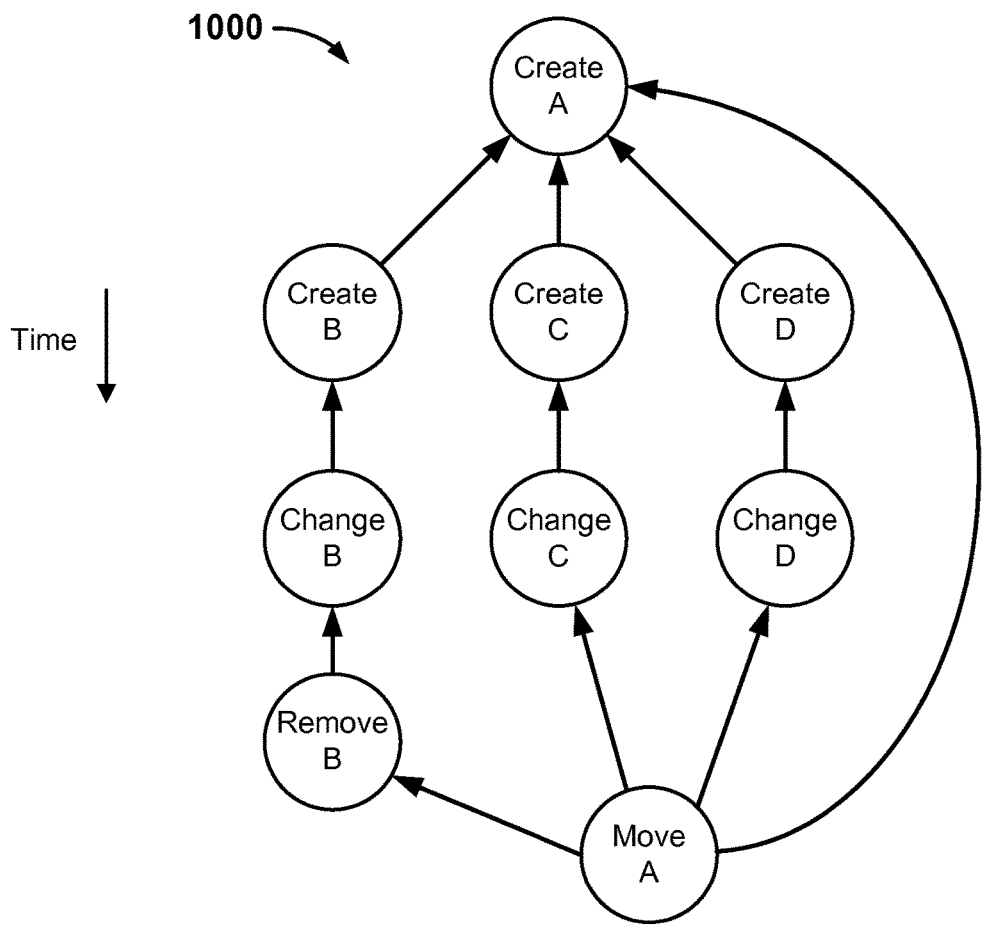
FIG. 10 is a block diagram illustrating an embodiment of a dependency graph of a set of file system metadata operations.

FIG. 10 is a block diagram illustrating an embodiment of a dependency graph of a set of file system metadata operations. In various embodiments, a dependency graph such as the one shown in FIG. 10 may be constructed, e.g., by a file system client such as client 902 of FIG. 9, with respect to file system operations written to a file system metadata operation buffer, such as buffer 904 of FIG. 9. In the example shown, the dependency graph 1000 includes for each of a plurality of file system operations affecting file system metadata a corresponding node that identifies the operation, the file system object (e.g., directory, file) with which the operation is associated, and data indicating which other operations in the dependency graph are ones from which the operation depends. In the example shown in FIG. 10, an object "A" (e.g., a directory) was created, followed by the creation of objects B, C, and D, (e.g., subdirectories). Each of the objects B, C, and D was subsequently modified (e.g., rename, new owner, updated time last modified, etc.). Subsequently, object "B" was removed (e.g., subdirectory and/or file deleted), and finally the entire directory "A" was moved to a new location.

In various embodiments, a dependency graph such as the one shown in FIG. 10 may be used to ensure file system operations affecting metadata are sent to the file system metadata server in a correct and/or required order. For instance, in the example shown in FIG. 10, directory A would have to be created before subdirectories B, C, and D could be created as children of directory A. Likewise, object B would have to be created before it could be modified.

In various embodiments, a dependency graph such as the one shown in FIG. 10 may be used to determine a set of operations to be included in a single communication to the file system metadata server. In various embodiments, compounding operations into a single communication may reduce latency and overhead associated with communicating file system metadata operations between a file system client and the file system metadata server.

Figure 11:
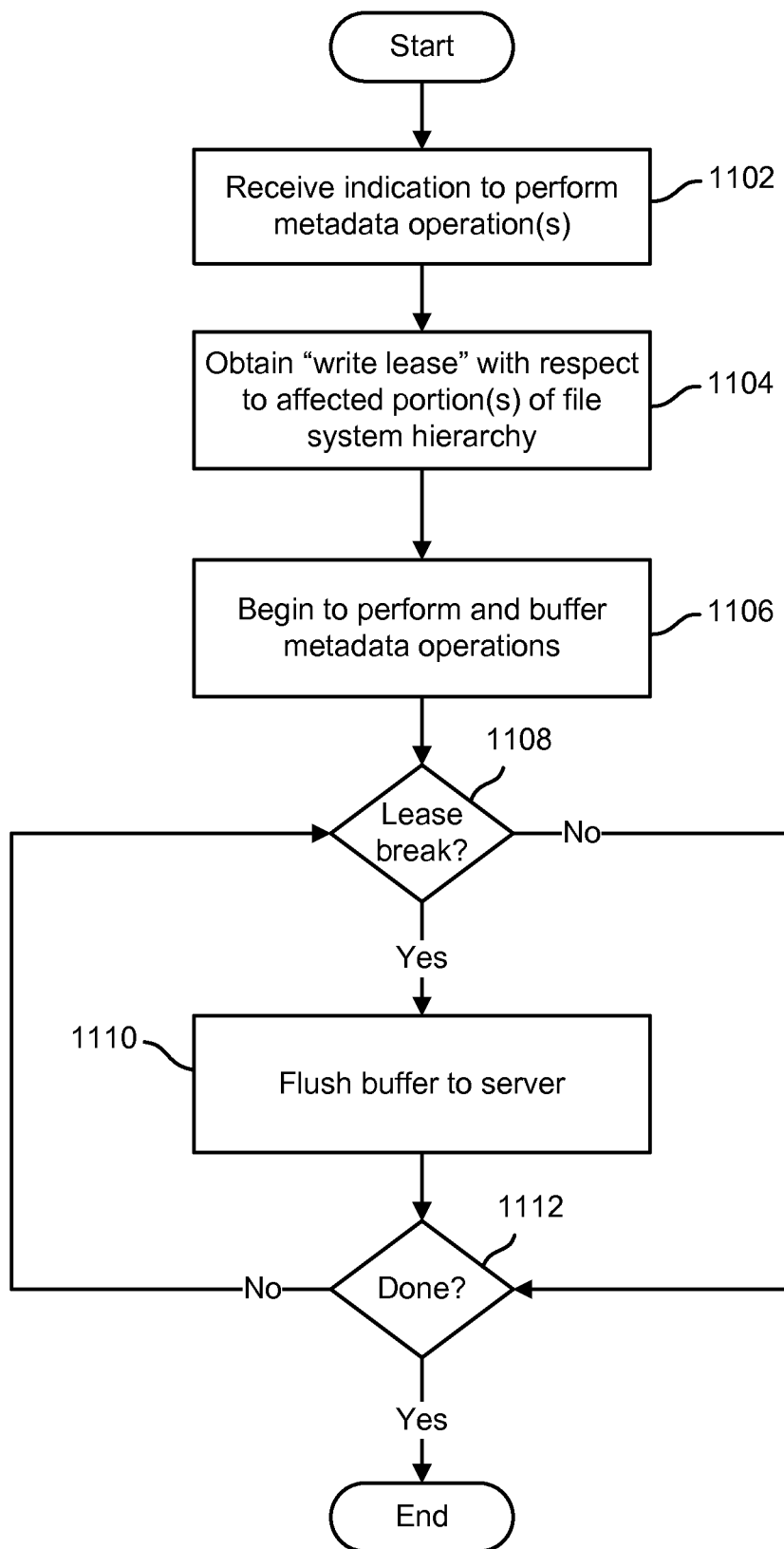
FIG. 11 is a flow chart illustrating an embodiment of a process to buffer distributed file system operations.

FIG. 11 is a flow chart illustrating an embodiment of a process to buffer distributed file system operations. In various embodiments, the process of FIG. 11 is implemented by a file system client, such as client 902 of FIG. 9. In the example shown, an indication to perform file system operations affecting file system metadata is received (1102). For example, a user may have selected a file system directory in a browser or other interface and/or an application may have submitted a request to store or access a file or other object. A "write lease" is obtained with respect to an affected portion(s) of file system metadata (1104). File system operations affecting metadata in the portion(s) of metadata for which a write lease was obtained are performed, including by buffering operations locally for asynchronous transmission to the file system metadata server (1106). If a lease break is received (1108), the buffer is flushed to the server (1110). In some embodiments, the entire buffer may be flushed. In some embodiments, only operations associate with the write lease(s) affected by the break are flushed. If file system operations affecting metadata remain to be performed (1112), work continues, including by buffering operations affecting metadata portions for which a write lease is held. Once no further operations remain to be performed, the process ends.

Figure 12:
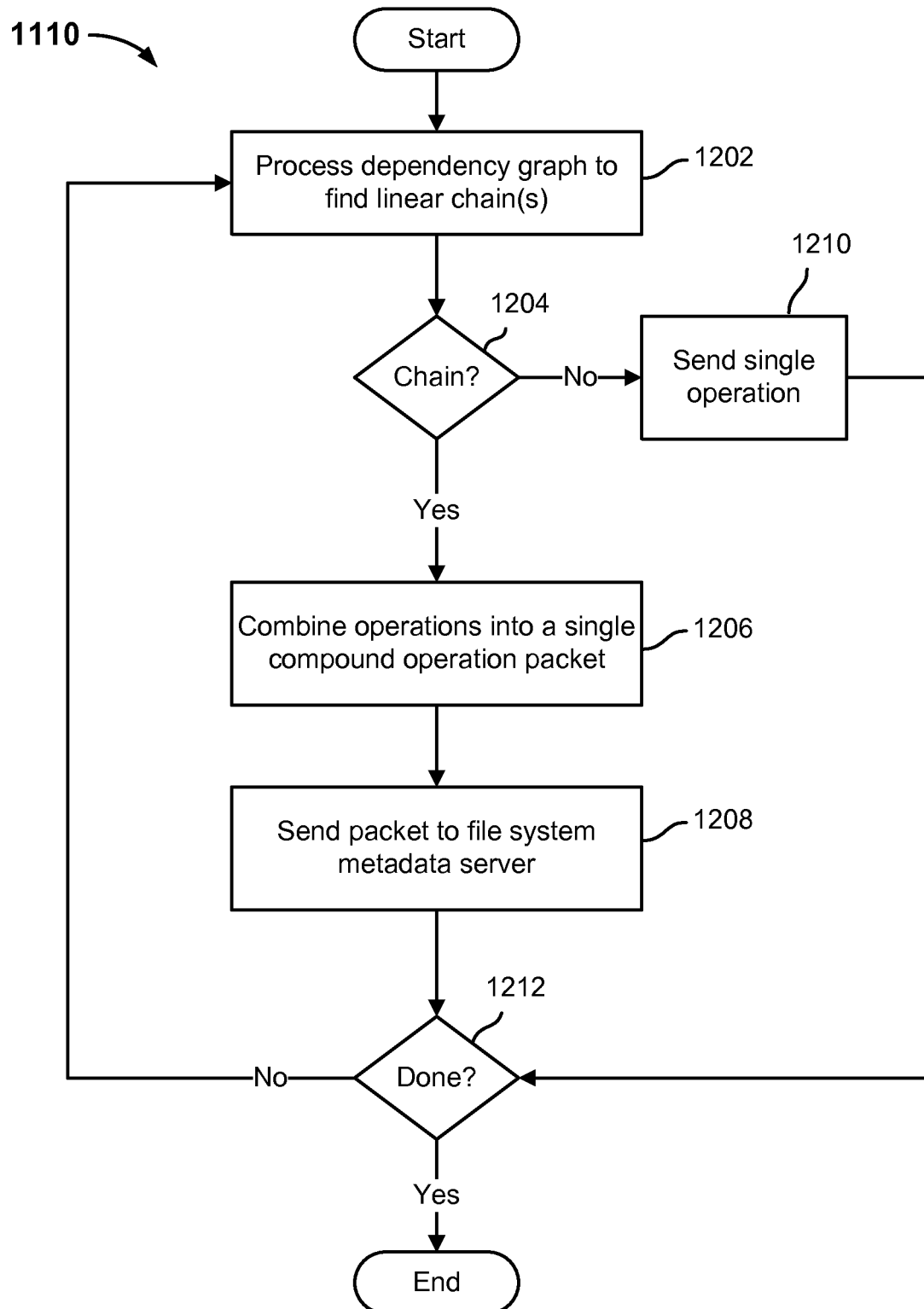
FIG. 12 is a flow chart illustrating an embodiment of a process to flush a file system metadata operation buffer.

FIG. 12 is a flow chart illustrating an embodiment of a process to flush a file system metadata operation buffer. In various embodiments, the process of FIG. 12 may be used to implement step 1110 of FIG. 11. In the example shown, a file system operation dependency graph is processed to find linear chain(s) comprising a sequence of operations each has at most a single dependency on a next prior operation in the chain and none of which has more than one inbound dependency (1202). If such a chain is found (1204), operations comprising the chain are combined into a compound operation that is packed into a single packet (1206) and sent to the file system metadata server (1208). If no linear chain is (or has not yet been) found (1204), a next single file system operation is sent to the file system metadata server in a packet containing just that operation (1210). In some embodiments, correct order is guaranteed by ensuring that no operation is sent to file system metadata server unless all operations on which it depends have already been sent. Processing continues until all operations required to be sent have been processed (1212).

Figure 13:
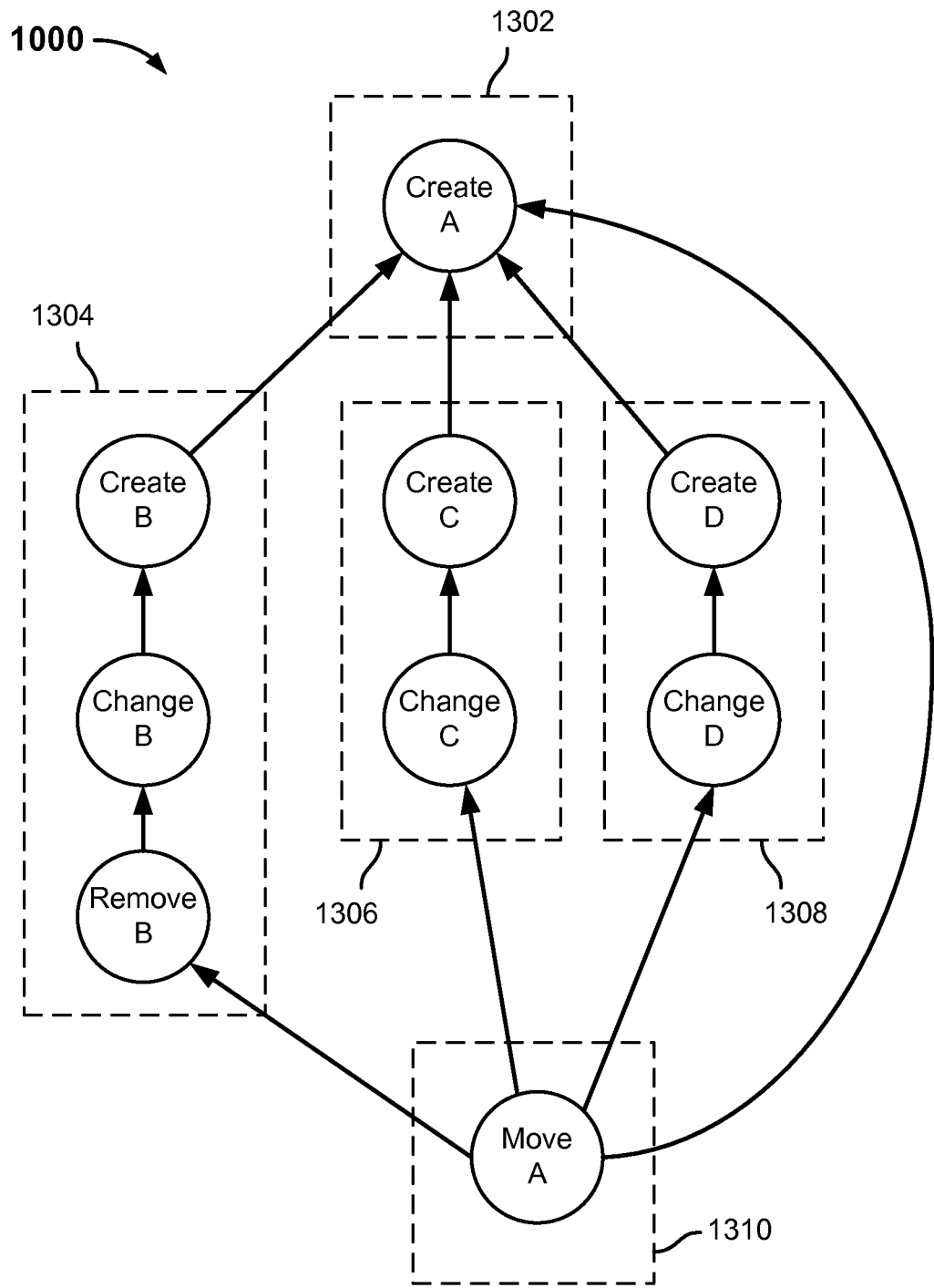
FIG. 13 is a block diagram illustrating an example of linear chains in a dependency graph.

FIG. 13 is a block diagram illustrating an example of linear chains in a dependency graph. In some embodiments, the process of FIG. 12 may be used to identify linear chains and singletons, as in the example shown in FIG. 13. In the example shown, the dependency graph 1000 of FIG. 10 has been processed to identify a first single operation 1302, a first linear chain 1304 comprising the three operations shown, a second linear chain 1306 comprising two operations, a third linear chain 1308 comprising two operations, and finally a second single operation 1310 that is not part of a linear chain. In various embodiments, each of the single operations 1302 and 1310 would be sent to the file system metadata server in a package containing just that operations, and for each of the linear chains of operations 1304, 1306, and 1308 the operations included in the chain would be combined to form a single, compound operation, each of which would be sent to the file system metadata server in a corresponding package. The result, in this example, would be to send the nine file system operations shown to the file system metadata server in a total of five packages, instead of a the nine packages that would have been required had each been sent on its own.

In various embodiments, redundant file system operations may be merged before being sent to the file system metadata server, enabling a reduced set of operations to be sent.

Figure 14:
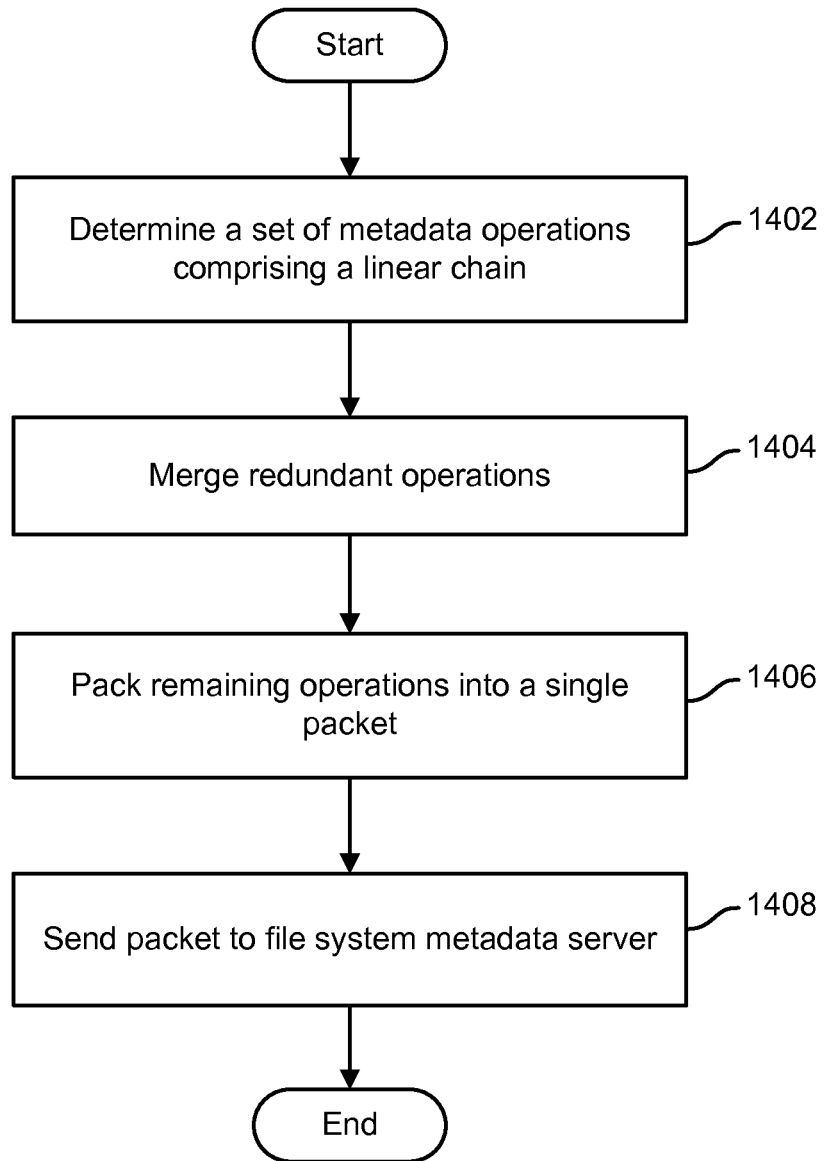
FIG. 14 is a flow chart illustrating an embodiment of a process to merge redundant distributed file system operations at the client side.

FIG. 14 is a flow chart illustrating an embodiment of a process to merge redundant distributed file system operations at the client side. In various embodiments, the process of FIG. 14 may be performed by a file system client, such as client 902 of FIG. 9. In the example shown, a linear chain of file system metadata operations buffered at the client is determined (1402), e.g., by processing a dependency graph as described above. Redundant operations in the chain, if any, are merged (1404). For example, a sequence of operations to change the "end of file" (EOF) attribute, e.g., as the file is modified and its size successively changed, in some embodiments would be merged into a single operation to set the attribute to an ending value indicated by the last operation in the sequence. In some embodiments, a linear chain is searched for redundant operations at least in part by identifying programmatically the file system metadata values (attributes) affected by each operation in the linear chain, and identifying as at least potentially redundant operations that set the same attribute to different values. In some embodiments, a validation processing is performed to ensure that all operations in the linear chain would succeed if all were sent to the file system metadata server in the correct order. If so, merging of redundant operations where possible is permitted. Once redundant operations comprising a linear chain, if any, have been merged (1404), the operations that remain are combined to form a compound operation that is included in a single package (1406), which is then sent to the file system metadata server (1408).

Figure 15:
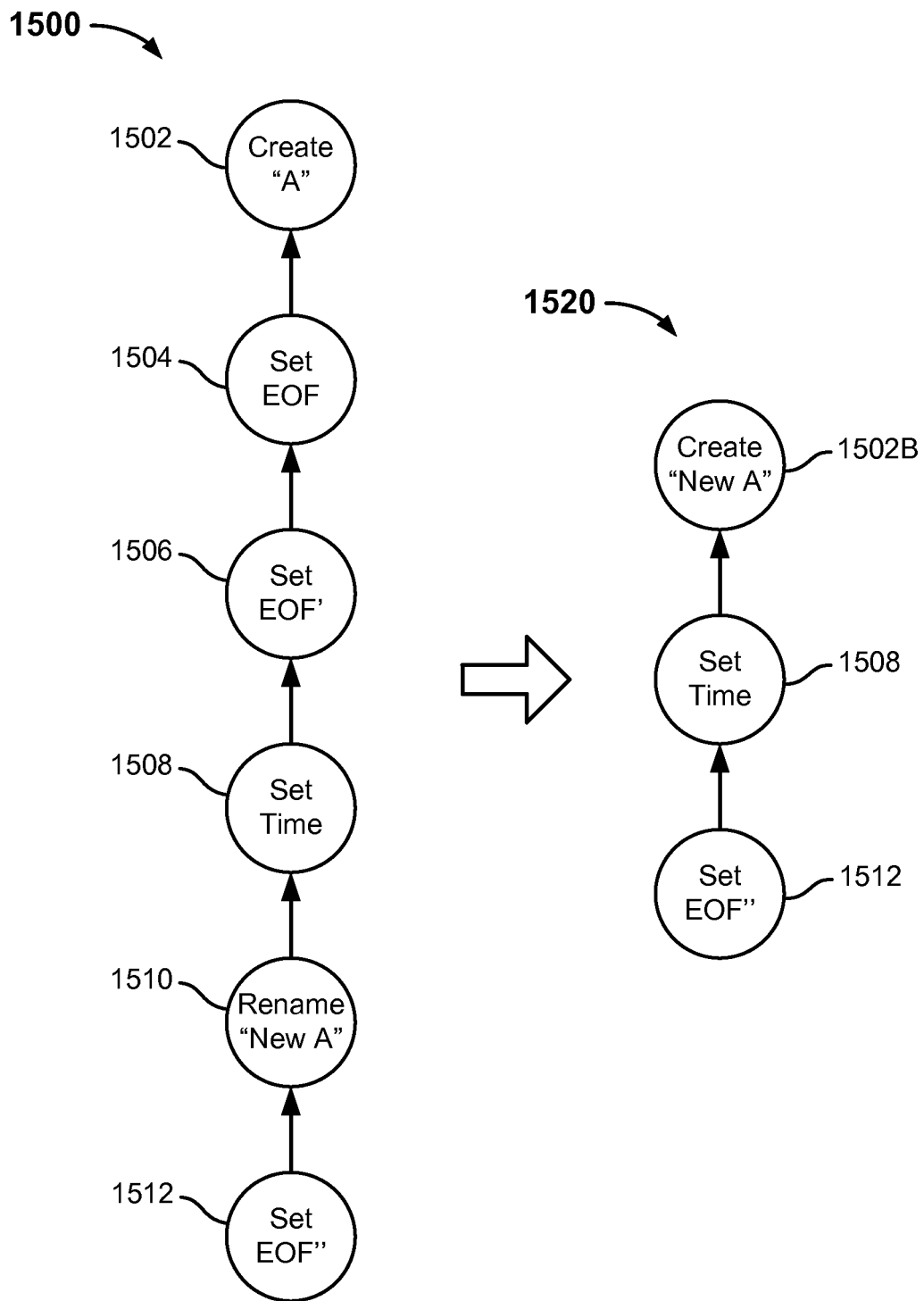
FIG. 15 is a block diagram illustrating an example of merging redundant file system metadata operations.

FIG. 15 is a block diagram illustrating an example of merging redundant file system metadata operations. In the example shown, a linear chain 1500 comprising a subgraph of a dependency graph representing the dependency relationships between buffered file system metadata operations includes operations 1502, 1504, 1506, 1508, 1510, and 1512, as shown. In this example, redundant operations are merged to form the reduced linear chain 1520 shown at right. The "create" operation 1502 and "rename" operation 1510 have been merged in this example into a single, modified operation 1502B to "create" an object having the name to which operation 1510 renamed the object created in operation 1502. In addition, the "set EOF" operations 1504 and 1506 have been merged into the final set EOF operation in the chain, i.e., operation 1512, which would result in the file size attribute being changed just once to value indicated in operation 1512.

Merging redundant operations, as in the example shown in FIG. 15, in various embodiments enables a smaller combined payload to be included in the single package sent to the file system metadata server to cause the file system metadata to be updated to reflect a linear chain of operations, and reduces the number of operations the file system metadata server has to perform to achieve that result.

In various embodiments, analysis of file system operations and the dependencies between them may be performed to determine that a set of file system operations, e.g., a subtree of the dependency graph, may be canceled without being sent to the file system metadata server, e.g., because the end result is the same as if the operations had been sent to and executed by the file system metadata server.

Figure 16:
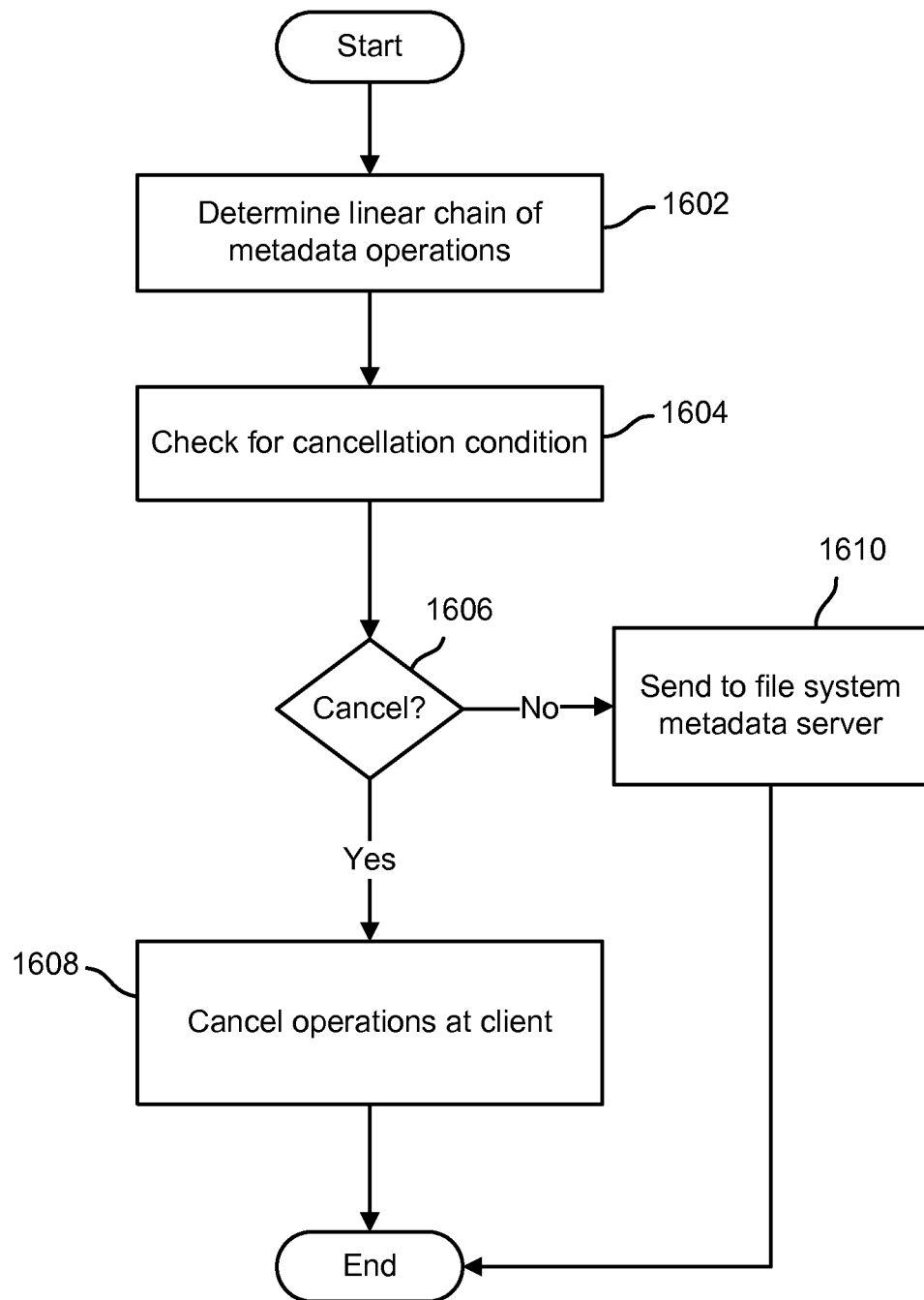
FIG. 16 is a flow chart illustrating an embodiment of a process to cancel file system metadata operations.

FIG. 16 is a flow chart illustrating an embodiment of a process to cancel file system metadata operations. In various embodiments, the process of FIG. 16 may be performed by a file system client, such as client 902 of FIG. 9. In the example shown, a linear chain of file system metadata operations buffered at the client is determined (1602), e.g., by processing a dependency graph as described above. A check is performed programmatically to determine whether a cancellation condition is met (1604). For example, a check may be performed to determine whether any net change would be made to file system metadata if the operations in the chain were performed, or if instead any values created or modified in the course of performance of the operations would be deleted or restored to their original, pre-chain values. For example, a linear chain bound by a create-delete pair of operations would in various embodiments be subject to cancellation, since any metadata created or modified for the object created by the create operation would be remove from the file system metadata by the delete operation. If so (1606), the entire chain of operations is canceled at the client (1608) and no operation in the chain is ever sent to the file system metadata server. Otherwise, operations comprising the chain (after merger, if applicable, in some embodiments) are sent to the file system metadata server to be performed (1610).

Figure 17:
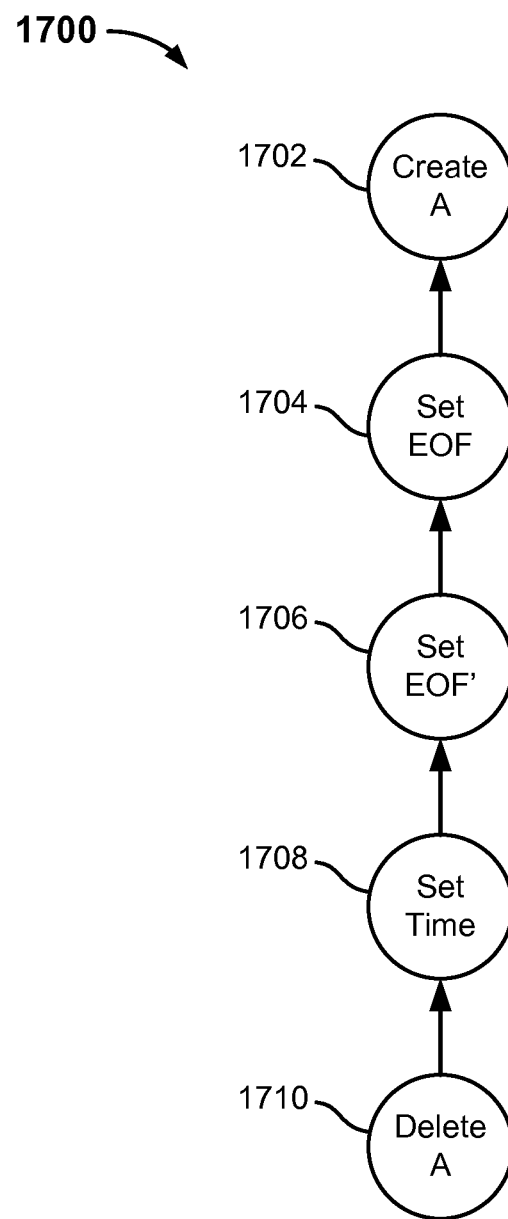
FIG. 17 is a block diagram illustrating an example of a linear chain of file system operations that would be subject to client side cancellation in various embodiments.

FIG. 17 is a block diagram illustrating an example of a linear chain of file system operations that would be subject to client side cancellation in various embodiments. In the example shown, the linear chain of operations 1700, comprising for example a subgraph of a dependency graph associated with a buffered set of file system metadata operations, begins with an operation 1702 to create an object "A", followed by operations 1704, 1706, and 1708 each of which would change one or more metadata attributes of object "A", and ends with an operation 1710 to delete the object "A". Taken together, the operations comprising chain 1700 are a non-event in terms of their net effect on file system metadata. Therefore, in various embodiments, the entire chain of operations 1700 would be canceled at the client side and never sent to the file system metadata server.

While the examples and embodiments described in connection with FIGS. 16 and 17 describe linear chains of operations that have no net effect on file system metadata, in various embodiments file system operations comprising other, not necessarily linear subgraphs of a buffered file system operation dependency graph may be subject to cancellation. For example, in some embodiments operations comprising any subgraph fully bounded (dominated) by a create-delete pair of operations may be cancelled.

Figure 18:
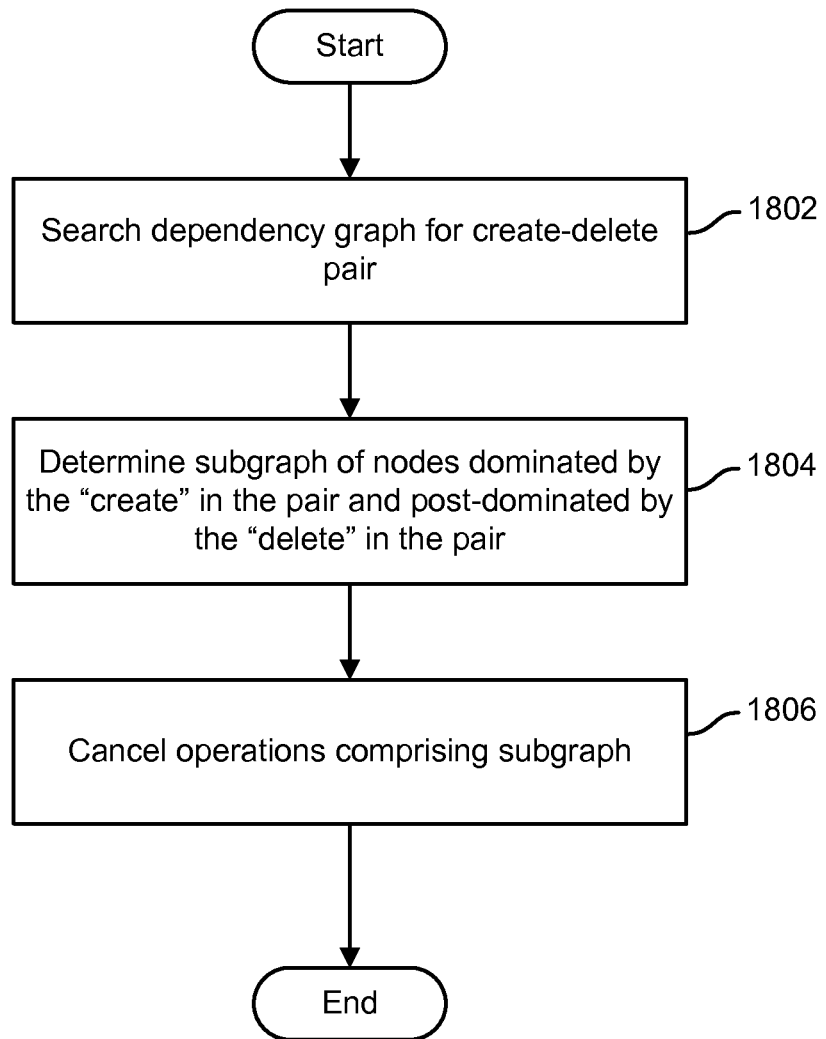
FIG. 18 is a flow chart illustrating an embodiment of a process to cancel file system metadata operations.

FIG. 18 is a flow chart illustrating an embodiment of a process to cancel file system metadata operations. In the example shown, create-delete pairs of operations are located in a file system operation dependency graph (1802). If it is determined that a create-delete pair bounds a subgraph of nodes that are dominated by the "create" operation and post-dominated by the "delete operation in the pair (1804) the operations comprising the subgraph are canceled (1806).

Figure 19:
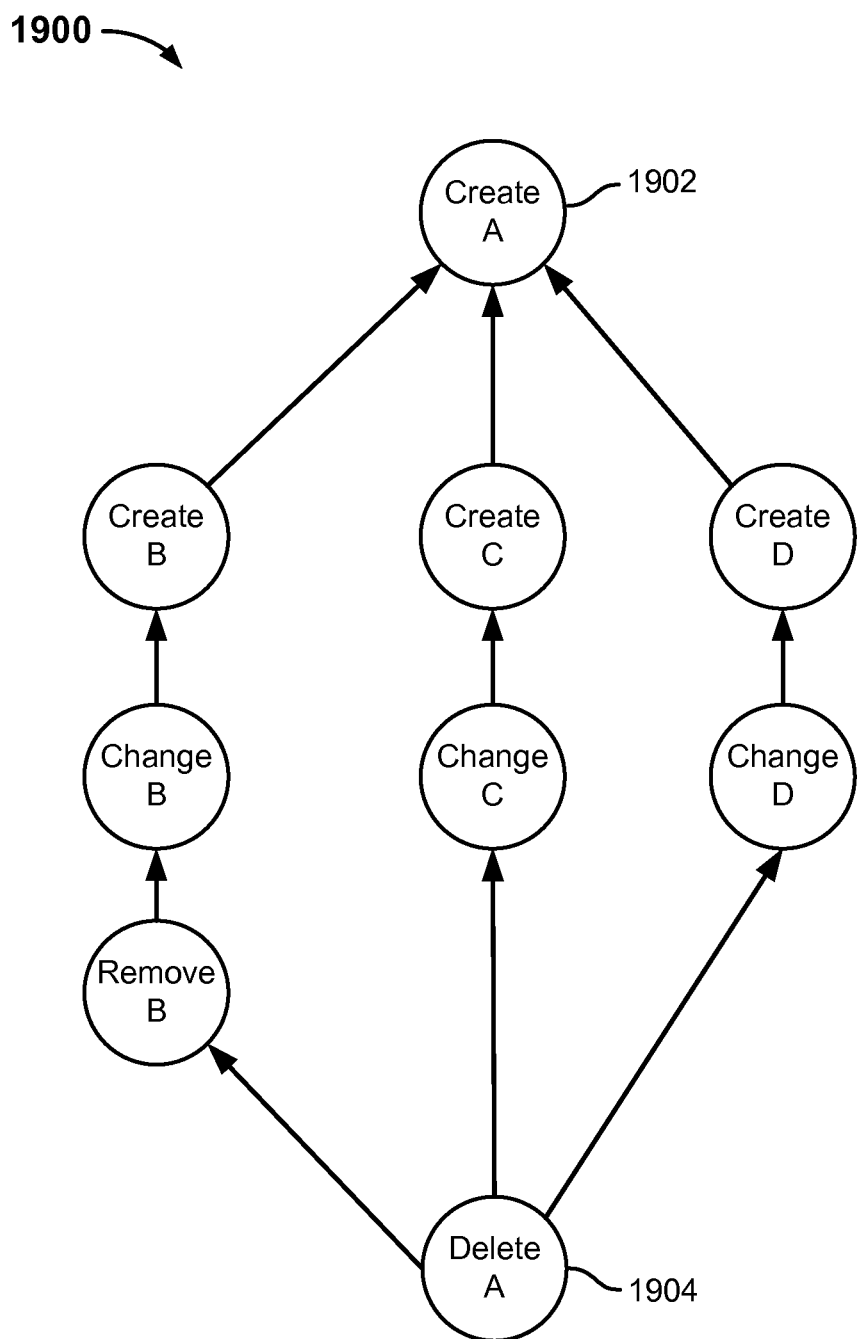
FIG. 19 is a block diagram illustrating an example of canceling file system operations.

FIG. 19 is a block diagram illustrating an example of canceling file system operations. In the example shown, a subgraph 1900 of a file system operation dependency graph is bound by a create operation 1902 and a delete operation 1904 comprising a create-delete pair of a same object "A". Because all operations in the subgraph are dominated by create operation 1902 and post-dominated by delete operation 1904, in various embodiments all operations in the subgraph would be canceled at the client side, without sending any of the operations to the file system metadata server.

In various embodiments, a lease over file system metadata may be an exclusive lease, i.e., a file system client may hold an exclusive lease to both read and write a metadata associated with a file system folder or subtree. In various embodiments, the exclusivity of file system metadata leases enables a file system client to reorder, merge, and/or cancel operations, as disclosed herein, even if the resulting sequence of operations as executed does not correspond to a sequential execution of a set of original operations. In various embodiments, the exclusivity of file system metadata leases allows a sequence of operations whose result is equivalent to the original sequence, but potentially having intermediate states that could not arise from the original sequence of operations.

In various embodiments, techniques disclosed herein may enable file system operations affecting file system metadata to be sent to a file system metadata server efficiently, and to avoid sending redundant operations, or sets of operations having no net effect on file system metadata, to the file system metadata server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing file system operations, comprising:
    receiving, by a client device connected to a distributed file system including a remote file system metadata server, an indication of a lease break with respect to a lease held by the client device, wherein the lease is associated with metadata stored by the remote file system metadata server; and
    in response to receiving the indication of the lease break,
        determining, by the client device, a first subset of locally-stored file system operations that collectively correspond to a non-event, wherein:
            the locally-stored file system operations are stored in a buffer at the client device;
            the locally-stored file system operations correspond to one or more file system calls made by an application running on the client device that are intercepted and redirected to the buffer at the client device;
            the locally-stored file system operations are associated with a portion of file system metadata corresponding to the lease; and
            the first subset is determined based at least in part on a dependency graph or other data structure reflecting dependencies of the locally-stored file system operations;
        cancelling, by the client device, the locally-stored file system operations comprised in the first subset;
        determining, by the client device, a second subset of the locally-stored file system operations to communicate to the remote file system metadata server in a single package, wherein the second subset is determined based at least in part on the dependency graph or other data structure reflecting dependencies of the locally-stored file system operations; and
        communicating, by the client device, the second subset to the remote file system metadata server, wherein communicating an operation of the second subset includes ensuring that the operation of the second subset is not sent to the remote file system metadata server unless all its dependent operations have already been communicated to the remote file system metadata server or are being communicated in connection with the operation, and
        wherein cancelling the locally-stored file system operations comprised in the first subset results in the locally-stored file system operations comprised in the first subset not being sent to the remote file system metadata server.

2. The method of claim 1, wherein the locally-stored file system operations comprise file system operations affecting file system metadata.

3. The method of claim 1, wherein the locally-stored file system operations comprise file system operations that have been buffered locally to permit asynchronous transmission to the remote file system metadata server.

4. The method of claim 3, wherein the portion of file system metadata corresponding to the lease corresponds to a portion of file system metadata with respect to which a metadata write lease is held.

5. The method of claim 3, wherein cancelling the locally-stored file system operations comprised in the first subset includes removing the locally-stored file system operations comprised in the first subset from the buffer without sending the locally-stored file system operations comprised in the first subset to the remote file system metadata server.

6. The method of claim 3, wherein cancelling the locally-stored file system operations comprised in the first subset includes removing the locally-stored file system operations comprised in the first subset from the dependency graph without sending the locally-stored file system operations comprised in the first subset to the remote file system metadata server.

7. A system, comprising:
    a memory or other storage device configured to store file system operations locally at the system prior to such file system operations being sent to a remote file system metadata server; and
    one or more processors of a client device connected to a distributed file system including a remote file system metadata server, the one or more processors coupled to the memory or other storage device and configured to:
        receive an indication of a lease break with respect to a lease held by the client device, wherein the lease is associated with metadata stored by the remote file system metadata server; and
        in response to receiving the indication of the lease break,
            determine a first subset of locally-stored file system operations that collectively correspond to a non-event, wherein:
                the locally-stored file system operations are stored in a buffer at the client device;
                the locally-stored file system operations correspond to one or more file system calls made by an application running on the client device that are intercepted and redirected to the buffer at the client device;
                the locally-stored file system operations are associated with a portion of file system metadata corresponding to the lease; and
                the first subset is determined based at least in part on a dependency graph or other data structure reflecting dependencies of the locally-stored file system operations;
            cancel the locally-stored file system operations comprised in the first subset;
            determine a second subset of the locally-stored file system operations to communicate to the remote file system metadata server in a single package, wherein the second subset is determined based at least in part on the dependency graph or other data structure reflecting dependencies of the locally-stored file system operations; and communicate, to the remote file system metadata server, the second subset, wherein communicating an operation of the second subset includes ensuring that the operation of the second subset is not sent to the remote file system metadata server unless all its dependent operations have already been communicated to the remote file system metadata server or are being communicated in connection with the operation, and wherein cancelling the locally-stored file system operations comprised in the first subset results in the locally-stored file system operations comprised in the first subset not being sent to the remote file system metadata server.

8. The system of claim 7, wherein the locally-stored file system operations comprise file system operations affecting file system metadata.

9. The system of claim 7, wherein the locally-stored file system operations comprise file system operations that have been buffered locally to permit asynchronous transmission to the remote file system metadata server.

10. The system of claim 9, wherein the portion of file system metadata corresponding to the lease corresponds to a portion of file system metadata with respect to which a metadata write lease is held.

11. The system of claim 9, wherein cancelling the locally-stored file system operations comprised in the first subset includes removing the locally-stored file system operations comprised in the first subset from the buffer without sending the locally-stored file system operations comprised in the first subset to the remote file system metadata server.

12. The system of claim 9, wherein cancelling the locally-stored file system operations comprised in the first subset includes removing the locally-stored file system operations comprised in the first subset from the dependency graph without sending the locally-stored file system operations comprised in the first subset to the remote file system metadata server.

13. A computer program product to process file system operations, the computer program product being embodied in a non-transitory computer readable storage medium and comprising computer instructions for:

receiving, by a client device connected to a distributed file system including a remote file system metadata server, an indication of a lease break with respect to a lease held by the client device, wherein the lease is associated with metadata stored by the remote file system metadata server; and in response to receiving the indication of the lease break,
determining, by the client device, a first subset of locally-stored file system operations that collectively correspond to a non-event, wherein:
the locally-stored file system operations are stored in a buffer at the client device;
the locally-stored file system operations correspond to one or more file system calls made by an application running on the client device that are intercepted and redirected to the buffer at the client device;
the locally-stored file system operations are associated with a portion of file system metadata corresponding to the lease; and the first subset is determined based at least in part on a dependency graph or other data structure reflecting dependencies of the locally-stored file system operations;

cancelling, by the client device, the locally-stored file system operations comprised in the first subset;

determining, by the client device, a second subset of the locally-stored file system operations to communicate to the remote file system metadata server in a single package, wherein the second subset is determined based at least in part on the dependency graph or other data structure reflecting dependencies of the locally-stored file system operations; and communicating, by the client device, the second subset to the remote file system metadata server, wherein communicating an operation of the second subset includes ensuring that the operation of the second subset is not sent to the remote file system metadata server unless all its dependent operations have already been communicated to the remote file system metadata server or are being communicated in connection with the operation, and wherein cancelling the locally-stored file system operations comprised in the first subset results in the locally-stored file system operations comprised in the first subset not being sent to the remote file system metadata server.

14. The computer program product of claim 13, wherein the locally-stored file system operations comprise file system operations that have been buffered locally to permit asynchronous transmission to the remote file system metadata server.

15. The computer program product of claim 14, wherein the portion of file system metadata corresponding to the lease corresponds to a portion of file system metadata with respect to which a metadata write lease is held.

16. The computer program product of claim 15, wherein cancelling the locally-stored file system operations comprised in the first subset includes removing the locally-stored file system operations comprised in the first subset from the buffer without sending the locally-stored file system operations comprised in the first subset to the remote file system metadata server.

17. The computer program product of claim 15, wherein cancelling the locally-stored file system operations comprised in the first subset includes removing the locally-stored file system operations comprised in the first subset from the dependency graph without sending the locally-stored file system operations comprised in the first subset to the remote file system metadata server.

18. The method of claim 1, wherein members of the first subset of the locally-stored file system operations are bounded by a create-delete pair of operations comprised in the first subset.

19. The method of claim 1, wherein the determining the second subset of the locally-stored file system operations to communicate to the remote file system metadata server in the single package comprises determining linear chains of operations.

20. The method of claim 19, wherein a set of operations corresponding to a linear chain of operations is communicated to the remote file system metadata server in a single communication.

21. The method of claim 20, wherein the linear chain of operations comprise a sequence of operations each of which has at most a single dependency on an immediately prior operation in the linear chain.

22. The method of claim 21, wherein the locally-stored file system operations were locally-stored in the buffer of the client device in response to corresponding operations being intercepted by a process running in a kernel of an operating system of the client device, and redirecting, by the process running in the kernel, the corresponding operations to a file system client that stores the locally-stored file system operations in the buffer.

23. The method of claim 1, wherein the second subset is communicated in connection with one or more uniform resource identifiers (URIs) corresponding to one or more file system objects affected by the second subset, and the remote file system metadata server stores payload data associated with the second subset in a location associated with the one or more URIs in response to determining that the one or more URIs are valid.

24. The method of claim 21, wherein the second subset is communicated to the remote file system metadata server in the single communication.

25. The method of claim 22, wherein the corresponding operations intercepted by the process running the kernel are communicated by the client device to the remote file system metadata server so as to be asynchronous with respect to when corresponding file system calls are intercepted by the process.

26. The method of claim 1, wherein a plurality of operations for changing an end of file attribute of a file that are comprised in a linear chain of the dependency graph from which the second subset is determined are merged into a single operation to set the attribute to an ending value indicated by a last operation in the linear chain.

\* \* \* \* \*